Patented July 23, 1946

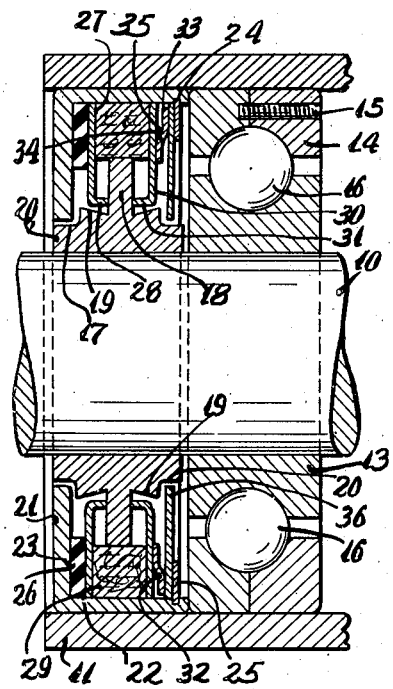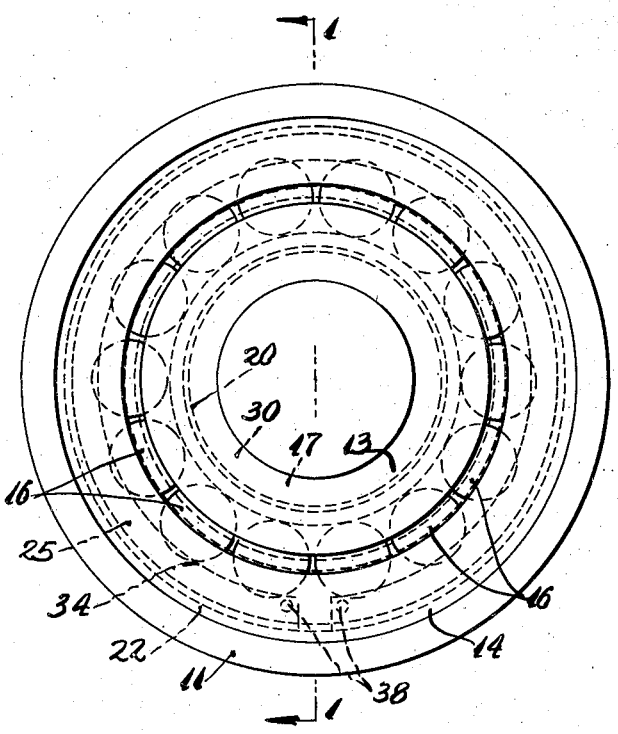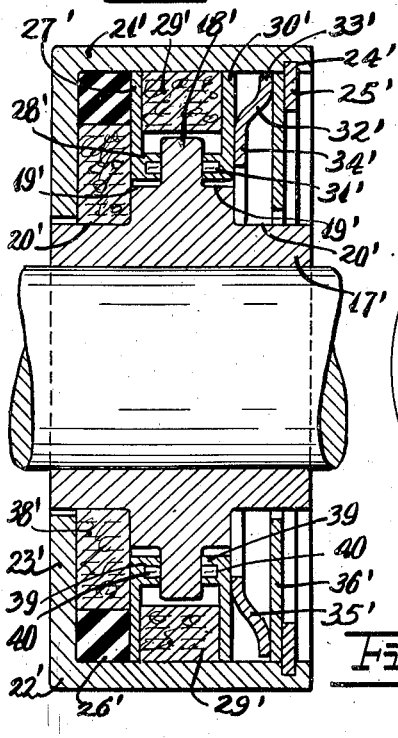

2,404,610

UNITED STATES PATENT OFFICE 2,404,610

OIL SEAL

Henry Clark Abell, Interlaken, N. J.

Application June 22, 1944, Serial No. 541,490

6 Claims. (Cl. 286—11)

This invention relates to new and useful improvements in a seal.

More specifically, the invention proposes the construction of a seal, such as a ball or roller bearing oil or grease seal, for sealing the space between a shaft and a housing against the loss of lubricant without the sealing taking place at either the shaft or the housing.

Still further it is proposed to provide a seal as aforesaid, having a part adapted to be secured to a shaft, a part adapted to be secured to a housing or the like, and sealing means between the parts.

Still further it is proposed to provide a seal as aforesaid in which the part secured to the shaft has a circular tongue and groove connection with the part secured to the housing.

Still further it is proposed to provide a seal as aforesaid provided with sealing material in engagement with the sides and edge of the circular tongue.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a section on the line 1—1 of Fig. 2 of a seal constructed in accordance with this invention, a shaft, a housing and a ball bearing being shown in association therewith.

Fig. 2 is a side elevation of the seal shown in Fig. 1, viewed from the right thereof.

Fig. 3 is a sectional view similar to Fig. 1 of a seal constructed in accordance with a modification of this invention.

Fig. 4 is an enlarged elevational view of a sealing disc of the seal of Fig. 3.

The seal of the present invention is especially adapted for use as a ball or roller bearing oil or grease retainer between a shaft and a housing, one or both of which may be rotatable, and it will be so treated, for simplicity, in the following description. However, it will be understood that the seal has general application to rotary structures for providing a retainer against the leakage of lubricant or other fluid from a space between rotary parts.

Referring to Fig. 1, it will be seen that the seal of the present invention is disposed between a shaft 10 and a housing 11, either or both of which may be rotatable. A ball bearing is also disposed between the shaft and the housing adjacent the seal. The seal and the ball bearing are of the same outside diameter. The ball bearing includes an inner raceway 13 pressed on the shaft 10, a two-part outer raceway 14 pressed in the housing 11, the two parts of the raceway 14 being secured together by tap screws 15, and balls 16 disposed between the raceways. Ball bearing 12 may mount the housing on the shaft or the shaft in the housing, as desired. For instance, the shaft 10 might be the rotatable rear axle of an automobile and the housing 11 might be the stationary axle housing of the automobile.

The seal, according to this invention, comprises an orificed member 17 rigidly secured to the shaft 10 by being pressed thereon. Member 17 has a center radial tongue 18, a shoulder 19 at each side of the tongue, each shoulder 19 being inclined outwardly from the tongue, and a shoulder 20 at the outer side of each shoulder 19. Member 17 is circular and consequently the tongue and shoulders are circular also. Shoulders 20 are of shorter radius than shoulders 19 and shoulders 19 are of shorter radius than tongue 18.

A casing 21 is rigidly secured in the housing 11 by being pressed therein. Casing 21 has a circular wall 22, concentric and in engagement with the inner face of the housing, and an orificed wall 23 at right angles to wall 22 and in line with one of the shoulders 20 which is disposed in the orifice of wall 23 with only working clearance therebetween. Wall 22 at its margin remote from the wall 23 is provided with an internal groove 24 for a split ring 25 which retains the following circular and parallel members: a synthetic rubber washer 26 parallel to and in engagement with the wall 23, engaging at its outer circumference the wall 22 and being spaced at its inner circumference from the adjacent shoulders 19 and 20; a sealing disc 27 in engagement with the washer 26 and the wall and extending radially inward from the washer 26 and having a flange 28 extending from its inner circumference toward tongue 18, which it engages with a sliding fit; a thick felt lubricating washer 29 engaging wall 22 at its outer circumference, the outer circumference of tongue 18 at its inner circumference, and disc 27 at one of its sides. The rubber washer 26 acts as a spring forcing the disc 27 against the washer 29 and against the tongue 18. As it is made of synthetic rubber, it is not affected by the oil or grease contained in the seal; another disc 30 which is similar to disc 27 but has a flange 31 oppositely disposed from flange 28 so that it extends toward flange 28. Disc 30 engages the other side of washer 29 and its flange engages the tongue 18 with a sliding fit; a disc plate pressure spring 32 engaging the disc 30 and forcing it against the washer 29 and the tongue 18. Spring 32 is shaped like a washer but has an outer portion 33 and an offset inner portion 34 connected by a reversely curved portion 35 which gives it a lateral spring action when it is forced against the disc 30.

The pressure plate or a washer 36 is disposed between the split ring 25 and the spring 32. The rubber washer 26 and the spring 32 maintain all of the parts of the seal in tight pressure fit. Split ring 25 has a hole 38 adjacent each side of its split for the insertion of a tool (not shown) to compress the split right for insertion and removal from the groove 24.

The operation of this form of device is as follows:

The roller bearing is lubricated with oil or grease, as desired. For instance, it may be lubricated with oil contained in housing 11 at the side of the ball bearing remote from the seal. The seal prevents the oil from passing out of the housing 11. As the ball bearing has parts pressed on the shaft and in the housing, the oil only passes through the ball bearing between the raceways. As casing 21 is pressed in the housing and as member 17 is pressed on the shaft, the oil cannot escape between these parts. Oil can pass between the washer 36 and the adjacent shoulder 20 due to the clearance therebetween. This oil lubricates the side of the tongue 18 engaged by the flange 31. Flange 31 prevents any excess of oil from passing between it and the tongue. However, it permits enough oil to pass therethrough to lubricate its engagement with the tongue so that the flange does not wear the tongue. This oil soaks into the felt washer 29 which therefore acts as a lubricant reservoir for oil, always maintaining a certain amount of oil for lubricating the parts of the seal rotatably engaging the member 17. Some of this oil lubricates the engagement of the flange 28 with the tongue so that wear does not result. Flange 28 prevents any excessive oil from passing between it and the tongue. Thus the seal effectively prevents any material escape of oil from the housing 11, only enough oil being permitted to pass through the seal to lubricate the seal and be used up therein.

The seal is employed at atmospheric pressure, no other pressure being needed to effect sealing by any of the parts. This is an advantage of the seal of the present invention. It is contemplated that the seal may be made of various diameters corresponding to standard diameters of ball and roller bearings, so that it will fit in the housings containing same. While specific materials have been stated, such as the synthetic rubber washer 26 and the felt washer 29, it will be understood that this is by way of example only and other suitable materials may be employed if desired.

In the modification of the invention shown in Figs. 3 and 4, the construction of the seal is similar to that previously described except the shoulders 19' are not inclined, and do not extend beyond the discs 27' and 30', the space between the synthetic rubber washer 26' and the adjacent shoulder 20' is filled with a felt washer 38', the felt washer 29' does not engage the tongue 18' and the flanges 28' and 31' are provided each with a groove 39 in which is disposed a felt sealing washer 40 in engagement with the adjacent side wall of the tongue 18'. Other parts of this seal corresponding to similar parts of the seal of Figs. 1 and 2 are indicated by like references with an accent added.

The operation of this form of device is substantially like the operation of the seal shown in Figs. 1 and 2, except that the felt washers 38 and 40 further prevent passage of oil or grease passed the seal.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patents is:

1. A lubricant seal comprising a circular member having a central orifice for receiving a shaft and a radial tongue, a casing having a central orifice in which said member is disposed, said casing being adapted to be secured in a housing, said casing having a circumferential wall concentric with said member orifice and another wall parallel to and spaced from said tongue, the outer circumference of said tongue being spaced from said casing circumferential wall, a lubricating washer in said space between said tongue and said casing circumferential wall, said washer being wider than said tongue, a sealing disc in engagement with each side of said lubricating washer and each disc having a flange concentric with and engaging the adjacent side of said tongue, an elastic resilient and massive rubber washer between said casing other wall and the adjacent sealing disc, a plate spring engaging the outer face of the other of said sealing discs, and means retaining said plate spring, said plate spring and said rubber washer exerting forces urging said sealing discs against said lubricating washer and said tongue.

2. A lubricant seal comprising a member having a central orifice for receiving a shaft and a radial tongue, a casing having a central orifice in which said member is disposed, said casing being adapted to be secured in a housing, said casing having a circumferential wall concentric with said member orifice and another wall parallel to and spaced from said tongue, the outer circumference of said tongue being spaced from said casing circumferential wall, a felt washer in said space between and engaging said tongue and said casing circumferential wall, a sealing disc in engagement with each side of said washer and with each side of said tongue, an elastic massive rubber washer between said casing other wall and the adjacent sealing disc, a plate spring engaging the outer face of the other of said sealing discs, and split ring means retaining said plate spring, said plate spring and said rubber washer exerting forces urging said sealing discs against said felt washer and said tongue.

3. A lubricant seal comprising a member having a central orifice for receiving a shaft and a radial tongue, a casing having a central orifice in which said member is disposed, said casing being adapted to be secured in a housing, said casing having a circumferential wall concentric with said member orifice and another wall parallel to and spaced from said tongue, the outer circumference of said tongue being spaced from said casing circumferential wall, a felt lubricating washer in said space between said tongue and said casing circumferential wall, said washer being wider than said tongue and engaging said tongue and said casing, a sealing disc in engagement with each side of said lubricating washer, each of said discs having a flange concentric with and engaging said tongue, an elastic resilient and massive synthetic rubber washer between said casing other wall and the adjacent sealing disc, a plate spring engaging the outer face of the other of said sealing discs, a pressure plate engaging the outer face of said plate spring, and a split ring retaining said pressure plate said plate spring and said rubber washer exerting forces urging said sealing discs against said lubricating washer and said tongue.

4. In combination, a housing, a shaft, antifriction bearings between said housing and said shaft, a circular member secured on said shaft and having a radial tongue, a casing having a central orifice in which said member is disposed, said casing being secured in said housing, said casing having a circumferential wall concentric with said member and another wall parallel to and spaced from said tongue, the outer circumference of said tongue being spaced from said casing circumferential wall, a washer between said tongue and said casing circumferential wall, a sealing disc in engagement with each side of said washer and with each side of said tongue, an elastic resilient and massive rubber washer between said casing other wall and the adjacent sealing disc, a plate spring engaging the outer face of the other of said sealing discs, and means retaining said plate spring, said plate spring and said rubber washer exerting forces urging said sealing discs against said tongue.

5. A lubricant seal comprising a member having a central orifice for receiving a shaft or the like and a radial tongue, a casing having a central orifice in which said member is disposed, said casing being adapted to be secured in a housing or the like, said casing having a circumferential wall concentric with said member orifice and another wall parallel to and spaced from said tongue, the outer circumference of said tongue being spaced from said casing circumferential wall, a lubricating washer disposed in said space between said tongue and said casing circumferential wall, a sealing disc in engagement with each side of said lubricating washer, each of said discs having a flange concentric with and extending toward said tongue, each of said flanges having a circular groove, a felt washer in each of said grooves each in engagement with a side of said tongue, a resilient rubber washer between said casing other wall and the adjacent sealing disc, a plate spring engaging the outer face of the other of said sealing discs, and means retaining said plate spring, said plate spring and said rubber washer exerting forces urging said sealing discs against said lubricating washer and said tongue.

6. A lubricant seal comprising a member having a hub provided with a central orifice for receiving a shaft or the like and a radial tongue extending from said hub, a casing having a central orifice in which said member is disposed, said casing being adapted to be secured in a housing, said casing having a circumferential wall concentric with said member orifice and another wall parallel to and spaced from said tongue, the outer circumference of said tongue being spaced from said casing circumferential wall, a lubricating washer disposed in said space between said tongue and said casing circumferential wall, a sealing disc in engagement with each side of said lubricating washer and with each side of said tongue, a resilient rubber washer between said casing other wall and the adjacent sealing disc and spaced from said hub, a felt washer disposed in said space between said rubber washer and said hub, a plate spring engaging the outer face of the other of said sealing discs, and means retaining said plate spring, said plate spring and said rubber washer exerting forces urging said sealing discs against said lubricating washer and said tongue.

HENRY CLARK ABELL.